March 31, 1931.  A. P. THURSTON  1,798,914
AIRCRAFT
Filed Dec. 7, 1928      4 Sheets-Sheet 1
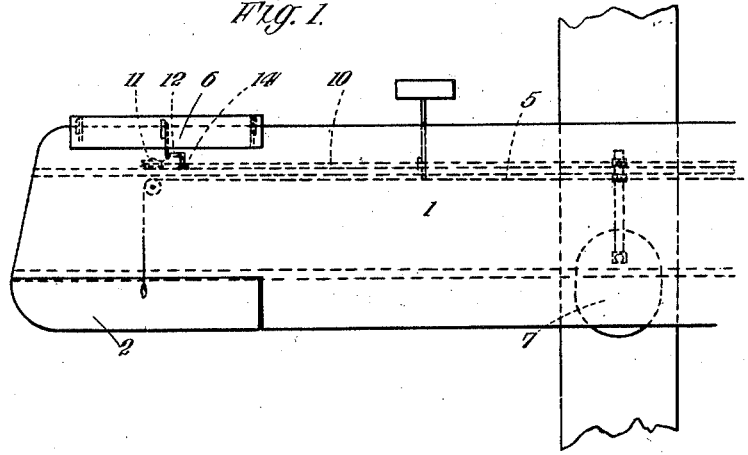
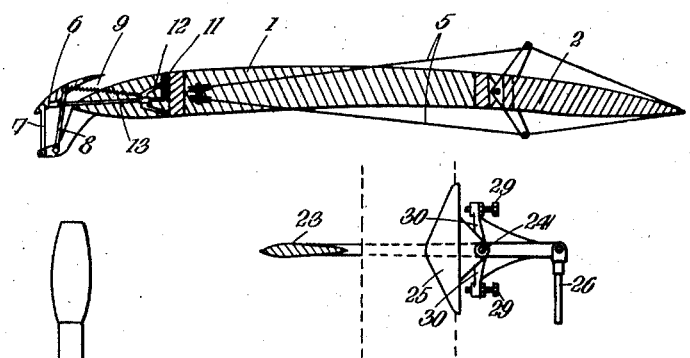
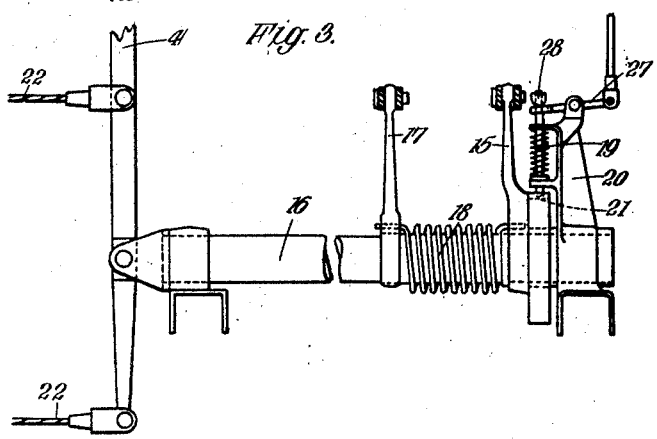
ALBERT PETER THURSTON
INVENTOR:
By
his Attorney.

March 31, 1931.   A. P. THURSTON   1,798,914
AIRCRAFT
Filed Dec. 7, 1928   4 Sheets-Sheet 2.
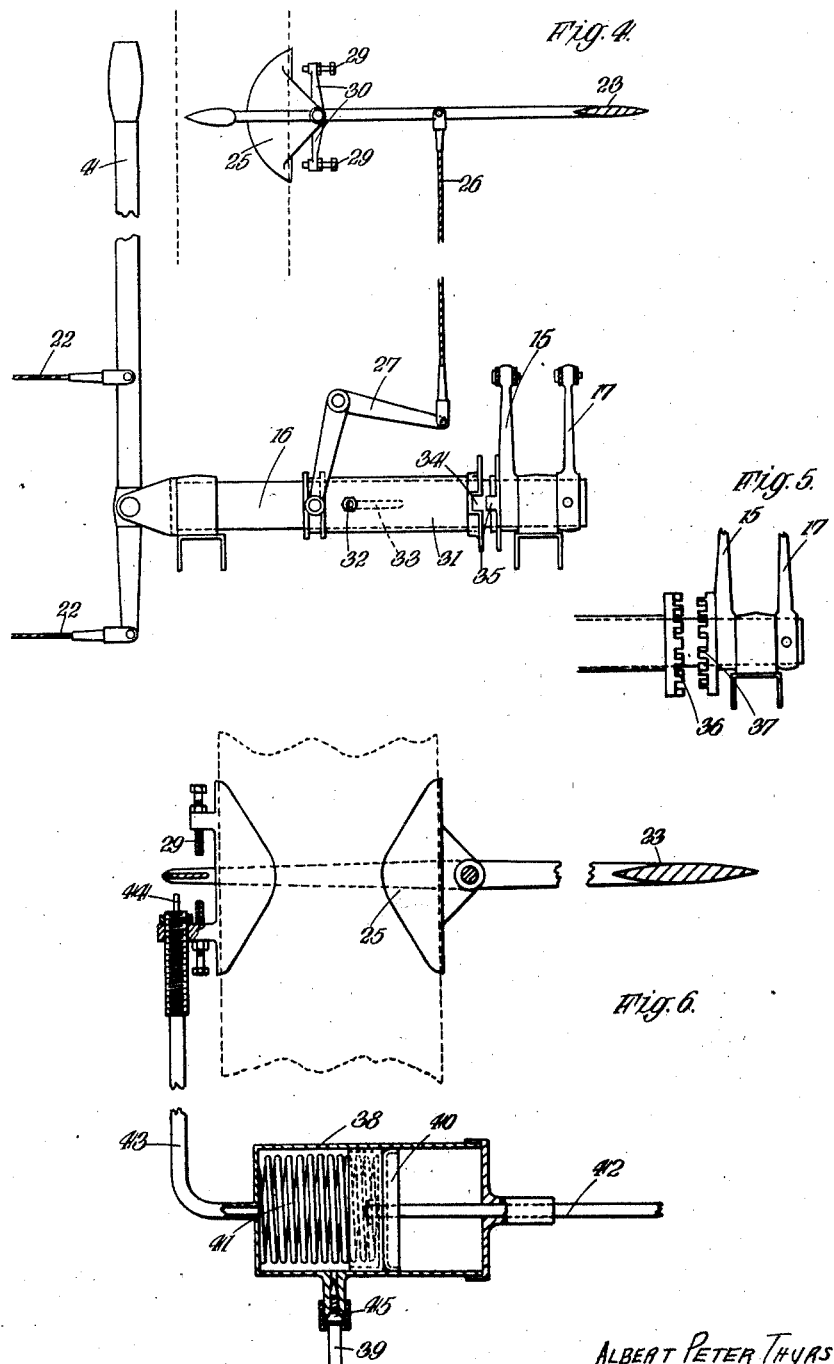

March 31, 1931.  A. P. THURSTON  1,798,914
AIRCRAFT
Filed Dec. 7, 1928  4 Sheets-Sheet 3
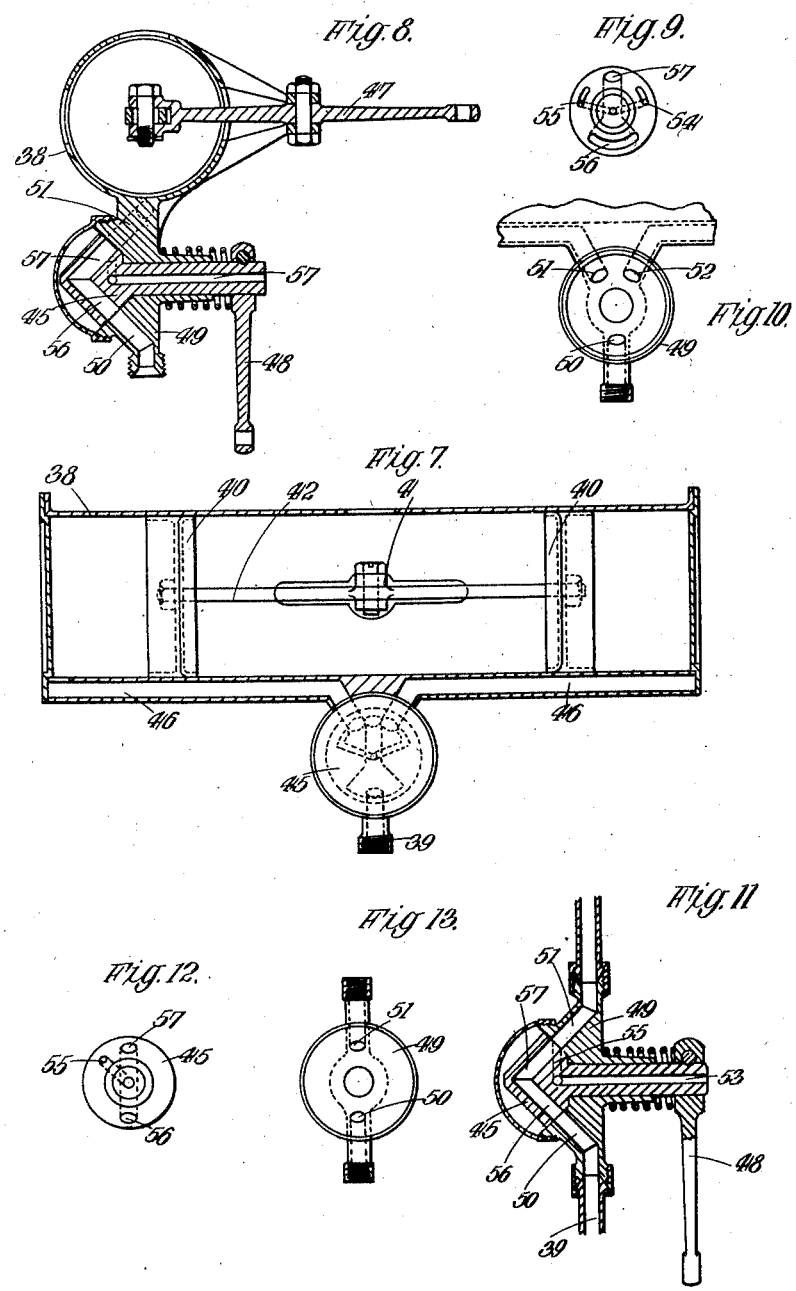
ALBERT PETER THURSTON
INVENTOR;

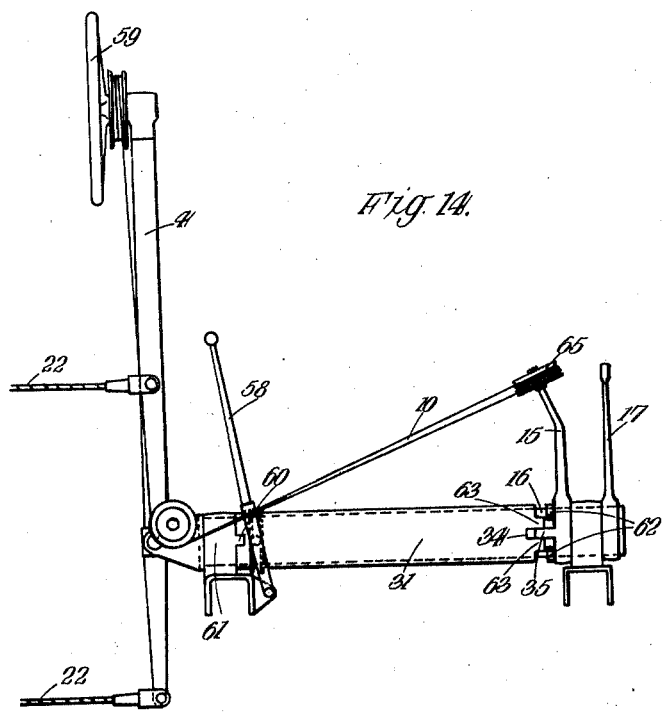

Patented Mar. 31, 1931

1,798,914

UNITED STATES PATENT OFFICE

ALBERT PETER THURSTON, OF LONDON, ENGLAND

AIRCRAFT

Application filed December 7, 1928, Serial No. 324,338, and in Great Britain February 2, 1928.

This invention relates to aircraft having alulas or alula control such as set forth in the prior British Patent No. 180,359 and particularly to "wings or planes having an alula or small plane, hereinafter called an alula, movably mounted in front of or above the shaped leading edge of the wing or plane to form with the shaped leading edge a gap backwardly inclined upwards at a negative angle with the wing or plane and means for varying independently or simultaneously the inclination and amount of projection of the alula".

According to this invention aircraft having any form of alulas mounted on the wings so as to open automatically when the wings are at a large angle are provided with means for controlling the alulas to prevent them opening when the attitude or the speed of the machine is such that there is no danger of stalling. Means controlled or operated by an air directional device may be provided for releasing means restraining the automatic opening of the alulas. Aircraft having the usual aileron control and any alula control may be provided with means for associating the alula and aileron control gear so that the alulas and ailerons may operate separately or simultaneously.

Means may be provided controlled or operated by an air vane or the like directional air device for connecting or disconnecting the control gear of the ailerons and alulas or causing the ailerons or aileron control gear to govern the alulas or alula control gear. The said air directional device may be arranged so that when the machine is flying at a high speed or low angle the two control gears are disconnected from each other whereby the alulas rest tightly against the nose of the machine and the ailerons are operated by the usual control lever or "joy-stick" and when the mahcine is flying at a larger angle than that of highest speed, hereinafter called a large angle, the controls are connected together or controlled by one another so that the alula is projected and rotated on the side in which the aileron is depressed. Thus the machine is under the joint control of the alulas and ailerons when not flying at high speed or low angle and is under only aileron control when flying at a high speed or low angle. It follows that the craft when at high speed or low angle may be kept under aileron control up to the full movement of the aileron without bringing in alula control. This may be of use in fighting and emergency manœuvres. The air vane or like directional air device may be loaded as by a spring or weight so that it will cause the alulas to be thrown into operation at less inclination of the machine to the air when flying slowly than when flying fast.

The control gear of the ailerons may be spring connected to the control gear of the alulas. The directional air device may be arranged to trip a catch which normally holds the alula control gear in its central position so that when the catch is tripped the alula control gear is operated in correspondence with the aileron control gear.

The control gear of the ailerons may govern a servo or like motor of any known kind operating the alulas. The directional air device may control the power supplied to a servo-motor so that the alulas will not operate when the machine is at low angle.

In order that the invention may be more fully understood and readily carried into effect it will now be described with reference to the accompanying drawings which illustrate various embodiments thereof, and wherein—

Figure 1 is a plan of a machine provided with alula and aileron control.

Figure 2 is a cross section of Figure 1 to an enlarged scale.

Figure 3 is a side view of the air vane and control gear.

Figure 4 is a side view of a modified form of air vane and control gear.

Figure 5 shows a modified detail of construction.

Figure 6 is a side view in part section of a pneumatic relay for the alula control gear governed by an air vane.

Figure 7 is a section of a servo-motor.

Figure 8 is a cross section of Figure 7 showing the valve gear.
Figure 9 is an end view of the valve.
Figure 10 is an end view of the valve seating.
Figure 11 is in cross section showing a modified valve gear.
Figure 12 is an end view of the valve.
Figure 13 is an end view of the valve seating.
Figure 14 is a side view of a modified form of control gear.

Referring to Figures 1, 2 and 3, the wings 1 are provided with ailerons 2 operated from the cockpit 3 by means of a joy-stick 4 and the usual cable 5, and alulas 6 mounted on the front edge of the wing 1 by means of links 7, 8. A spring 9 is provided to hold the alulas 6 in their normal closed position. The alulas are operated by a cable 10 passing over pulley 11. Bell-crank levers 12 are provided to each wing. One end of the bell-crank is connected to the alula by means of a link 13 and the other end of the bell-crank has an eye or fork through which the cable 10 passes. Stops 14 are mounted upon the cable 10 so as to engage against the end of the bell-crank lever 12 when moved in one direction and to be free from it when moved in the other direction. The cable 10 is connected to a lever 15 rotatably mounted upon a rocking shaft 16 operated by the joy-stick 4. The cables 5 controlling the ailerons are connected to a lever 17 fixed to the shaft 16. A spiral spring 18 is mounted on the shaft 16 and connects the levers 15 and 17 so that rotation of lever 17 tends to rotate the lever 15 in the same direction. The lever 15 is normally locked in its central or neutral position in which both alulas are shut by means of a spring catch 19 sliding in a fixed part 20 and engaging a notch 21 in a boss on the lever 15. The joy-stick 4 is provided with cables 22 to control the elevators in the usual way.

The spring catch 19 is tripped by an air vane 23 which is connected to any part of the machine such as a strut by means of a horizontal pivot 24 and a bracket 25. The vane is connected to the spring catch by means of a link 26 and a lever 27 pivoted to the fixed part 20. The lever 27 has an eye or forked end which slides over the spring catch 19, and the spring catch is provided with an adjustable head 28 for engagement by the lever 27. The air vane 23 is provided with adjustable stops 29 mounted in arms 30 on the vane lever. These stops engage the bracket 25 and limit the amount of motion of the vane. The vane 23 is mounted so as to run into the wind before its pivot point and the adjustable stops 29 are so arranged that when the machine is flying at normal angles the air will act on top of the vane and press it downwards so that there will be no tendency to trip the spring catch 19. As the inclination of the machine to the air increases and the stalling angle is approached the downward pressure on the vane decreases until at a predetermined angle below the stalling angle the pressure reverses causing the vane to swing over onto its other stop with a jerk and to trip the catch 19 whereby the alulas are operated simultaneously with the ailerons through the medium of the spring 18.

It will be seen that the invention permits the ailerons and alulas to be so proportioned relatively that when a righting rolling couple is generated a yawing couple is also generated which tends to sweep the lower wing around on the outside of the circle, thereby obviating the use of the rudder to correct the drag of the aileron on the lower side of the wing as is necessary with the existing form of aileron control. An adjustable spring, not shown, may be provided to return the air vane to its normal position when the machine has returned to its normal inclination to the air.

In the modification shown in Figure 4 the alula control cable 10 is connected to the lever 15 and the aileron control cable 5 to the lever 17. The cable 10 in this modification is so arranged that when pulled by the lever 15 in either direction the alula on the side pulled is opened. A spring (not shown) may be provided to hold the lever 15 normally in the central position. Rotation of the sliding tube 31 upon the control shaft 16 is prevented by a bolt 32 passing through a slot 33 in the shaft 16. The end of the tube 31 is provided with a notch 34 adapted to engage a corresponding projection 35 on the lever 15 to lock the alula and aileron controls together. The tube 31 is engaged by a lever 27 operated by a link 26 from the air vane 23.

The end of the tube 31 may be provided with a series of teeth 36 as shown in Figure 5 adapted to engage a corresponding series of teeth 37 on the lever 15 so that the two controls may be locked together whatever their relative positions.

Figure 6 shows a pneumatic relay device. This device may be used for locking the two controls together. A cylinder 38 is connected to a source of suction by means of a tube 39. A piston 40 is mounted within the cylinder 38 and a compression spring 41 normally holds the piston at one end of the cylinder. The piston 40 has a piston rod 42 which operates the locking device or mechanism of the two controls. A tube 43 in the end of the cylinder 38 is closed at its outer end by a valve 44 which is so situated that it may be engaged by the air vane 23 and caused to open and relieve the suction in the cylinder 38. An automatic nonreturn valve 45 in the suction pipe 39 prevents the alulas being operated or released by a momentary stoppage of the engine causing a loss of suction in the cylinder 38. The operation of this device is as follows. When the engine is running and the machine flying at normal angle the suction of the engine exhausts the air from the cylinder 38 and the piston compresses this spring 41, and the piston rod 42 releases the locking device of the two controls. When the machine approaches the stalling angle the air vane 23 reverses and opens the valve 44 releasing the suction in the cylinder 38 thereby permitting the spring 41 to force the piston 40 to the other end of its stroke and thereby lock the two controls together. As soon as the machine returns to a normal angle the valve 44 closes and the suction being regenerated in the cylinder, the piston is again sucked back and the two controls disconnected.

In a modified application of this device the piston rod 42 may be arranged to operate the alulas directly.

In a further application of the device shown in Figure 6, the piston rod 42 is connected to some means which restrains the alulas from opening automatically when the spring 41 is compressed and which allows the alulas to open freely automatically when the suction is released in the cylinder 38 and the piston is pushed to the end of its stroke by the spring 41. The said restraining means may consist of a cable passing over pulleys and connected either directly or by springs to the lower side of the alulas on opposite sides of the machine. This cable may normally be sufficiently slack, or the spring sufficiently weak, to enable the alulas to open automatically, and the piston rod 42 may be connected to the centre of the cable, between the said pulley, so as to tension the cable by laterally displacing it when the spring 41 is compressed, and to allow it to be slack when the suction in the cylinder 38 is released. It will be understood that any other form of relay governed by an air directional device may be used for restraining the alulas from opening automatically when the speed or attitude of the machine is such that there is no danger of stalling.

Figures 7 to 10 inclusive show details of a double action servo-motor. The cylinder 38 is provided with two pistons 40 connected together by the piston rod 42. The two ends of the cylinders are connected to the power tube 39 by means of a reversing valve 45 and passages 46.

The piston rod 42 is operatively connected to a rocking lever 47 which in turn is connected to the alula control gear. The air directional device 23 operates a valve (not shown) in the power tube 39. The aileron control gear is connected to the valve lever 48 by a lost motion device, not shown, such as stops on the control cable, so that when the aileron is operated more than a predetermined amount to one side or the other the valve is tripped thereby causing a reversal of the servo-motor and causing a corresponding operation of the alulas in correspondence with the aileron. Spring or other convenient means may be provided to return the servo-motor to its central position when the aileron control gear returns towards its central position. The valve 45 is rotatably mounted in a casing 49 having three ports 50, 51 and 52. The port 50 is connected to the power tube 39 and the ports 51, 52 to the feed passages 46. The valve 45 is provided with a central air passage 53 opening to ports 54, 55 and with main ports 56 and 57 for registering with the ports 50, and either 51 or 52 respectively.

The ports 54, 55 which are open to the air are so arranged that the port 54 registers with the power port 51, when the main port 57 registers with the power port 52; and vice versa.

Figures 11, 12 and 13 show a modified form of valve gear suitable for operating a single action pneumatic relay for operating the alulas such as that described with reference to Figure 6.

In this modification the alulas are restrained from opening as previously described by the pull of the piston rod. The valve casing 49 is provided with two ports 50, 51 and the valve 45 with two ports 56, 57 and an air port 55 connected to the air hole 53. A spring is mounted in the cylinder to return the piston as described previously when the air port 55 registers with the port 51.

The operation of this single action servo-motor having the valve gear shown is as follows:

The valve lever 48 is connected to the air directional device previously described, and the piston is connected to the control cable of the alulas so as to restrain them from opening while the suction in the servo-motor is maintained. When however the air directional device trips over at a large angle of the machine the valve 45 is rotated so as to break the suction in the cylinder and remove the restraint upon the automatic opening of the alulas.

Figure 14 shows a further modification in which the aileron and alula control is associated on the same control column 4, and manually operated means are provided for connecting or disconnecting the two controls. The ailerons are operated by the lever 17 and the alulas either by rotation of the control wheel 59 or by rocking motion of the lever 15. A hand lever 58 is provided for locking the lever 15, either in a central fixed position or to the rocking shaft 16. In the first case the alulas are operated by the control wheel, and in the second case the alulas and ailerons are operated together by side motion of the control column. The sliding tube 31 is provided at one end with a notch which engages a projecting lug 60 on the fixed bearing 61 and at its forward end with a notch 34 which is engaged by a long lug 35 on the lever 15. The shaft 16 is provided with short lugs 62. When the lever 15 is in its central position, in which it is normally held by the alula control gear, there are gaps between the lugs 62 and lug 35 which may be filled by lugs 63 on the end of the tube 31.

The operation of this device is as follows: When the various parts are in the position shown in Figure 14 the tube 31 is locked against rotation by the lug 60 and the lever 15 is correspondingly locked by the lug 35. The ailerons are operated by side motion of the control lever 4 and the alulas by rotation of the control wheel 59 which winds up and pays out one or other of the cables 10 which pass in opposite directions over the pulleys 63.

When the hand lever 58 is pushed forwards, this tube 31 is disconnected from the lug 60 and is free to rotate with the shaft 16 and the lugs 63 of the tube 31 are forced between the lugs 62 and the lug 35 thereby locking the lever 15 to shaft 16, whereby both the alulas and the ailerons are correspondingly operated so as to obtain the control desired.

When the hand lever 58 is pulled backwards the alula control is immediately disconnected from the aileron control. If the control column is centralized at this instant or if the hand wheel is turned to allow the springs to centralize the lever 15 the tube 31 will engage the fixed lug 60 and again lock the lever 15.

I claim:—

1. In aircraft including a wing, a relatively small plane movably associated with the wing to define a slot, manual means for controlling movements of said small plane, and aerodynamically actuated means normally preventing the manual control of said small plane but responsive to changes of angle of incidence of said wing to permit the manual means to control the movement of said small plane.

2. In aircraft, a fuselage, and a wing, ailerons mounted on said wing, small planes mounted for movement relative to said wing to define a slot, manual means for actuating the ailerons, said means normally inoperative to control movement of the small plane, a wind vane responsive to changes in direction of the airstream operable to couple the manual controlling device with the small plane whereby the small plane and the aileron may be simultaneously manually controlled.

3. In aircraft, a wing, an aileron mounted on the wing, and a small plane movable relative to the wing to define a slot, controlling elements respectively engaging the aileron and the small plane, means including a manually oscillatable shaft for controlling the movement of the aileron, means oscillatable to control the small plane but normally disconnected from the manual means, a wind vane carried by the aircraft and responsive to changes in the flying angle of the aircraft, and means actuated by the wind vane for coupling the small plane actuating mechanism to the manually controlled aileron actuating mechanism for the simultaneous manual controlling of the small plane and the aileron.

4. In aircraft, a wing, an aileron mounted on the wing, a small plane mounted on the wing but movable relative thereto to define a slot, a rotatable shaft, manual means for rotating the shaft, an arm mounted for rotation with the shaft, means connecting said arm with the aileron for moving same in response to movement of the arm, a secondary arm normally stationary relative to the rotatable shaft and to said first mentioned arm, means connecting said second arm with said small plane, and means operable to couple both said arms to said shaft so that the aileron and small plane may be simultaneously controlled by said manual means.

5. In aircraft, a fuselage, and a wing, ailerons mounted on said wing, small planes mounted for movement relative to said wing to define a slot, manual means for actuating the ailerons, said means normally inoperative to control movement of the small plane, a wind vane responsive to changes in direction of the airstream operable to couple the manual controlling device with the small plane whereby the small plane and the aileron may be simultaneously manually controlled, said wind vane and said small plane controlling mechanism so arranged so that a decrease in the angle of incidence of the wind vane disconnects the small plane controlling mechanism from the manual means and returns the small plane to contacting position relative the wing without affecting the manually controlled movement of said aileron.

ALBERT PETER THURSTON.